(No Model.) 2 Sheets—Sheet 2.

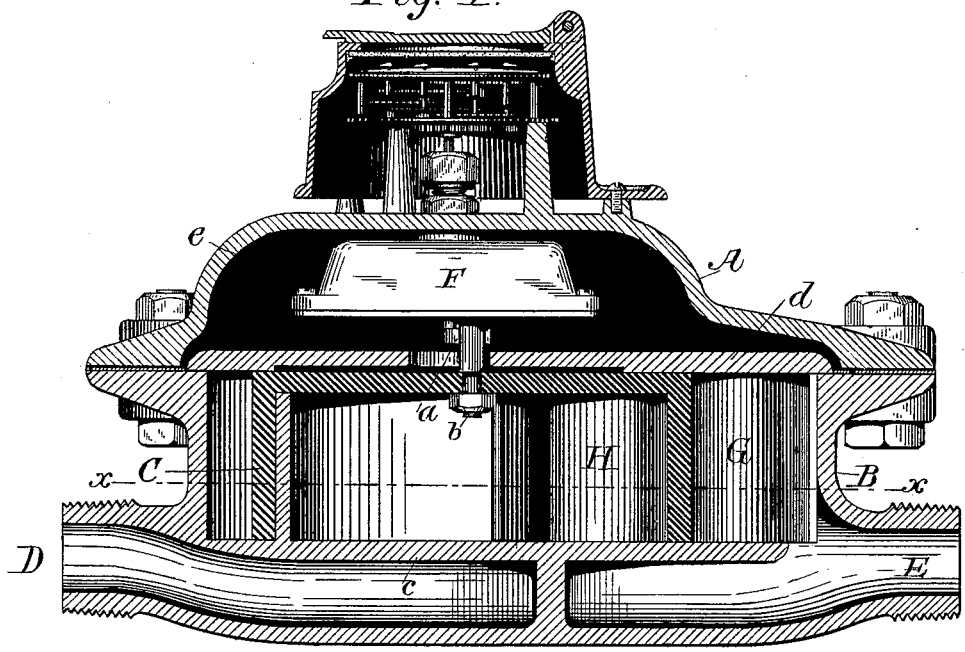

J. A. TILDEN.
ROTARY WATER METER.

No. 371,643. Patented Oct. 18, 1887.

Witnesses
J. M. Dolan,
Fred. B. Dolan.

Inventor
James A. Tilden
by his attys
Clarke & Raymond.

UNITED STATES PATENT OFFICE.

JAMES A. TILDEN, OF HYDE PARK, MASSACHUSETTS, ASSIGNOR TO THE HERSEY METER COMPANY, OF PORTLAND, MAINE.

ROTARY WATER-METER.

SPECIFICATION forming part of Letters Patent No. 371,643, dated October 18, 1887.

Application filed January 31, 1887. Serial No. 225,959. (No model.)

*To all whom it may concern:*

Be it known that I, JAMES A. TILDEN, of Hyde Park, in the county of Norfolk and State of Massachusetts, a citizen of the United States, have invented a new and useful Improvement in Fluid-Meters, of which the following is a full, clear, and exact description, reference being had to the accompanying drawings, forming a part of this specification, in explaining its nature.

The invention relates to an improvement in that class of meters in which the cylindrical piston divides the cylindrical case into measuring-spaces by means of an interior guiding-abutment, which controls the piston in its movement and causes its surface to be brought into contact with the surface of the case and maintained in such contact during the movement of the piston in the case, such line of contact being a constantly-advancing line of contact from the place where the piston first touches the surface of the casing to effect a division of the casing into a receiving and discharge space. This movement of the piston in the case is an oscillating movement.

In my present invention the piston not only has an oscillating movement to divide the case, as above described, but, because of the manner in which it is guided, it may also have a rotary movement, which will not, however, affect its oscillation. It is more properly an oscillating meter than a rotary meter, the rotation arising from the nature of the construction, and providing certain improvements in the wearing properties, without, however, affecting materially the principles of its operation.

The invention comprises a continuous annular ring-piston open at one end and a casing having a cylindrical chamber provided with an annular guiding-ring, the outer surface of which is concentric with the inner surface of the piston-casing, and a free compensating-abutment governed in its action upon the piston by hydraulic action only.

The invention further relates to various details of organization and construction, all of which will be hereinafter described.

Figure 3:
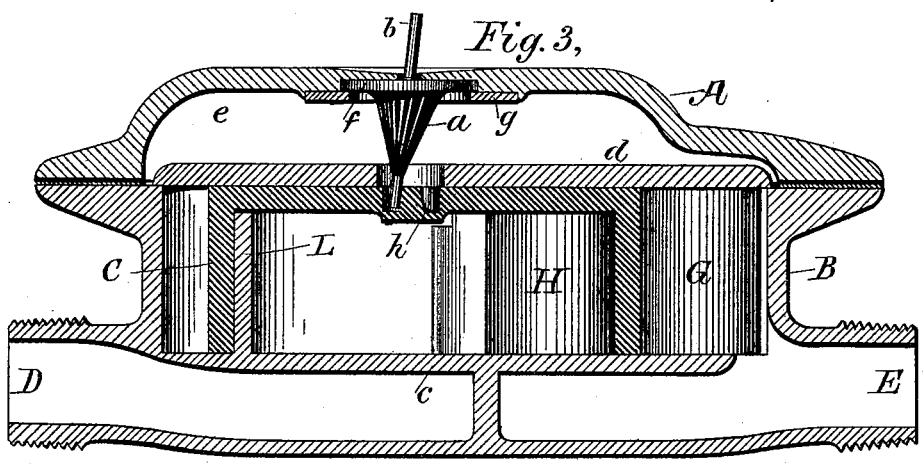
Figure 4:
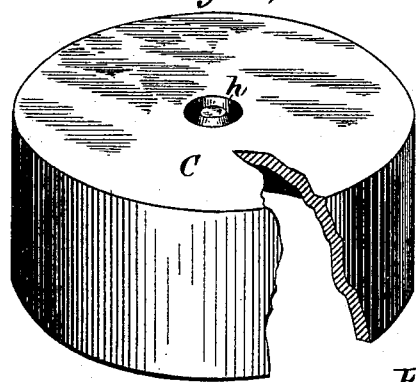
Figure 5:
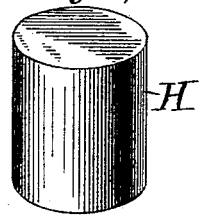
Figure 6:
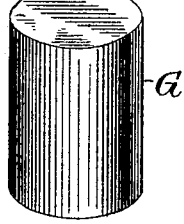

In the drawings, Figure 1 is a view, in vertical central section, of a meter containing my invention. Fig. 2 is a horizontal section taken on the dotted line *xx* of Fig. 1. Fig. 3 is a view, in vertical section, of a section of the meter to represent the employment of a special or peculiar form of device for transmitting the motion of the piston to the registering mechanism, the object of which will be hereinafter explained. Fig. 4 is a perspective view of the piston, a portion of the casing being broken out to show its form more fully. Figs. 5 and 6 are perspective views of the abutments.

C is the piston. Preferably it is shaped as represented in Fig. 4—that is, it has a solid end with a continuous annular ring or section extending therefrom. It may be formed of hard rubber by molding, or it may be made in any other desired way and of any other suitable material.

B is the meter-case. It is well shown in Figs. 1, 2, and 3, and it has the solid bottom, except where perforated for the ports, as hereinafter described, and a ring, L, extending upward from the bottom and concentrically arranged in relation to the inner wall of the meter-case, and between which and the outer wall is the annular piston-chamber, which is adapted to be divided by the piston into the measuring and receiving spaces, as hereinafter indicated. This concentric ring L, preferably, is cast solid with the bottom and case and of a suitable non corrosive composition, and the upper surface of the concentric ring and the inner surface of the case are finished to present smooth surfaces. The case is extended outward upon the inlet side to form or provide a recess, M, which is of a size to receive one of the abutments G; and there is formed in the ring L, opposite this recess M, an inward-extending recess, N, which receives the other abutment H. These abutments are in the form of two rolls—that is, each abutment G H is a cylindrical roll—and they are entirely free or unconfined in their respective recesses, and they are separated from each other by the wall of the piston C, and with the piston are held in place by the plate *d*, which also forms the top of the piston-chamber. In the bottom or lower section of the case there is an inlet-passage, E, and a coupling end and the outlet-passage D and a coupling end. The inlet-passage, preferably, is of a form shown in full and dotted lines, Fig. 2, to conduct the liquid into the recess M by means of the port K, and also to the center of the meter-case by means of the port J. The relation which these ports K J bear to the recesses M N and the piston-chamber is well shown in Fig. 2. The outlet-passage is of the shape represented by the dotted lines in Fig. 2, and the piston-chamber is connected with it by means of the port I.

The operation of the meter is as follows: The fluid enters the port K from the induction-passage, filling the recess M and pressing the abutment-roll G against the periphery of the piston. At the same time the liquid enters the piston-chamber through the port J, thereby causing the abutment-roll H to be pressed against the inner surface of the piston-wall at a point opposite the outer abutment-roll, G, and this contact is maintained by the head or pressure of the liquid. This will cause the division of the piston-chamber into a fluid-receiving space or section and a fluid-discharging space or section. It will be seen that the spaces contained within the ring L and from the contact-point of the roll H with the piston (see Fig. 2) to the contact-point 1 of the piston and ring L form the liquid-receiving space when the position of the piston is as shown, the pressure of the liquid acting to maintain the abutment-roll H against the piston. The space contained between the outside of the piston and the inside of the case from the contact-points 3 to 4 and the space marked 2 between the abutment-roll H and the contact-point 1 being open to the outlet-passage D, when the liquid leaves or flows from these spaces, the pressure or head causes the piston to rotate, a division of the chamber being maintained between the piston, the wall of the case, and the abutment-rolls. It will be understood, also, that if the piston should be confined at the contact-points between the abutment-rolls it would have an oscillating movement in the piston-chamber, the rolls sliding back and forth in their respective recesses. In order that the piston may be maintained in contact with the wall of the chamber, and to prevent it from taking a central position in the case, I connect the piston with the spindle of the registering mechanism by means of an arm, a, which is fastened to the lower end of said spindle to extend laterally therefrom, and which is adapted to bear against the metal piston-spindle b. This mechanism is fully set forth in my application for Letters Patent filed August 15, 1885, Serial No. 174,463. In lieu of this connection between the piston and the registering mechanism or devices, I may use a spindle mounted in a flexible support, as shown in Fig. 3, and which is, in many respects, like that described in my application for Letters Patent filed January 20, 1887, Serial No. 224,964, and it comprises a metal spindle which is molded within a rubber support, which is secured to the cover A by means of a clamping-ring, g. The lower end of the spindle enters the circular groove in the upper end of the piston, (see Figs. 3 and 4,) so that the elasticity of the rubber upon compression operates eccentrically through the spindle upon the piston and acts to keep it against the side of the case, and at the same time forms, in substance, a frictionless stuffing-box.

My invention is an improvement over any rotary meter of the class to which it relates heretofore devised, in that the abutments for controlling the movement or positions of the piston are free or unconfined in their action, except so far as controlled by the direct action of the fluid under pressure upon them, and they distribute the wear that may take place upon themselves and the piston, so that they may be called "compensating-abutments."

By the use of the flexible connection the abutments are not only unconfined mechanically, but the piston is, to a certain extent, free—that is, should any sediment or foreign matter get between the piston and the case it would temporarily displace the piston until washed out, when, by the action of the rubber, it would be immediately returned to operative position. I prefer that the abutment-rolls be made of hard rubber; but they may be made of any other suitable material. The outer abutment-roll, G, is, it will be seen, somewhat longer than the inner abutment-roll, H. It will also be seen that the ring L has the two inward-extending sections or flanges $h\ h'$, which form the recess N, and which are shaped to prevent the roll H from being moved out of operative position; also, that the inner surface of the section or flange $h'$ and the inner surface, $h^2$, of the extension of the meter-case to form the recess M form bearings or supports against which the rolls G H are forced and held by the fluid-pressure while they maintain their contact with the wall of the piston and move horizontally therewith.

It will be seen that the plate $d$ is removable to permit the piston to be removed from the meter-case. Any suitable form of registering mechanism may be employed. It will further be seen that the meter is made, preferably, in two parts—namely, the lower section, which contains the piston-chamber, and an upper section, which contains in the construction shown in Fig. 1 a reducing-gear.

I am aware that meters having a slotted ring, forming the operating-piston contained in a cylindrical case and governed in its division thereof by a stationary abutment, is not new, as the same is described in the British patents to Maudslay, numbered 136, dated January 19, 1853, and 13,921, dated January 26, 1852, and I therefore do not claim the same, broadly.

Having thus fully described my invention, I claim and desire to secure by Letters Patent of the United States—

1. A fluid-meter having a case provided with a cylindrical piston-chamber and a concentric piston-guiding ring contained in said chamber, a continuous annular ring-piston adapted to divide said chamber into receiving and discharging spaces by the contact of its walls with the inner wall of said case and the outer wall of the said concentric ring, and free or movable abutments maintained in contact with the piston by means of the direct action of the fluid, substantially as set forth.

2. A fluid-meter having a case containing a cylindrical piston-chamber and a concentric guiding-ring, a piston adapted to divide the cylindrical chamber into receiving and discharging spaces by means of abutments controlled or held in place by hydraulic action, and a device connecting the piston with the register, whereby the piston is assisted in maintaining its divisional lines of contact, substantially as set forth.

3. A fluid-meter having an annular piston-chamber and a concentric piston-guiding ring, a piston adapted to divide the piston-chamber into receiving and discharging spaces by means of hydraulic-controlled abutments, and a flexible spindle or device for permitting the movement of the piston from its normal path for assisting in returning it therein, substantially as described.

4. The combination, in a fluid-meter, of a case having an annular piston-chamber, a concentric piston-guiding ring adapted to divide the chamber into receiving and discharging spaces, free abutments maintained in contact with the piston by fluid-pressure, and registering mechanism and a device for connecting the piston therewith, substantially as set forth.

5. A fluid-meter having a case provided with an annular piston-chamber and a concentric piston-guiding ring and a continuous annular ring-piston and free movable compensating-abutments, each of which is held or maintained in contact, one with the inner surface of the wall of the piston and the other with the outer wall thereof, whereby the piston is adapted to have an oscillating movement and is further adapted to move freely between the abutments, substantially as set forth.

6. The combination, with a cylinder-case having a concentric ring within it and provided with inlet and outlet passages, of a continuous ring-piston confined in the case by a removable plate and adapted to have an eccentric motion within said case between the concentric ring and the inner wall of the case to divide it into receiving and discharging spaces, and free compensating-abutments consisting of contact rolls or pieces free to move within corresponding chambers or recesses in the cylinder-case and concentric ring, and maintained in continuous contact with the piston by the pressure of the liquid, as and for the purposes described.

7. The combination, in a fluid-meter, of a case having an annular piston-chamber and a concentric ring within said case, a piston composed of an end plate having an annular ring extending therefrom, the chambers or recesses M N, the abutment-rolls G H, the inlets K J, and the outlet I, substantially as described.

8. The combination, in a meter, of the case having a recess, M, extending therefrom and the bearing-surface $h^2$, a concentric ring having the recess N extending inward therefrom and the bearing surface $h'$, the piston having the annular ring and the case, and two abutments adapted by the fluid-pressure to be held in contact, the first with the bearing-surface $h^2$ and the outer surface of the piston-wall, and the second with the bearing-surface $h'$ and the inner surface of the piston-wall, as and for the purposes described.

JAMES A. TILDEN.

In presence of—
F. F. RAYMOND, 2d,
FRED. B. DOLAN.